(12) United States Patent
Hamilton (10) Patent No.: US 11,550,942 B2
(45) Date of Patent: Jan. 10, 2023

(54) UNIVERSAL FILE ACCESS CONTROL SYSTEM AND METHOD

(71) Applicant: Atos IT Solutions & Services Inc., New Castle, DE (US)

(72) Inventor: Scott L. Hamilton, Edgar Springs, MO (US)

(73) Assignee: BULL SAS, Les Clayes sous Bois (FR)

( * ) Notice: Subject to any disclaimer, the term of this patent is extended or adjusted under 35 U.S.C. 154(b) by 220 days.

(21) Appl. No.: 17/081,780

(22) Filed: Oct. 27, 2020

(65) Prior Publication Data
US 2022/0129573 A1  Apr. 28, 2022

(51) Int. Cl.
G06F 21/62 (2013.01)
G06F 21/31 (2013.01)
G06F 16/14 (2019.01)

(52) U.S. Cl.
CPC ........ G06F 21/6218 (2013.01); G06F 16/148 (2019.01); G06F 16/156 (2019.01); G06F 21/31 (2013.01); G06F 2221/2141 (2013.01)

(58) Field of Classification Search
CPC ...... G06F 21/62; G06F 21/6218; G06F 21/31; G06F 2221/2141; H04L 63/101; H04L 63/0838
See application file for complete search history.

(56) References Cited

U.S. PATENT DOCUMENTS

| | | | | |
|---|---|---|---|---|
| 7,702,693 B1 * | 4/2010 | Aiyagari | ............. | G06F 21/6218 707/783 |
| 8,060,890 B2 * | 11/2011 | Odaira | ............... | H04N 1/00214 710/1 |
| 8,788,815 B1 * | 7/2014 | Garcia | ................. | H04L 63/061 713/165 |
| 9,264,480 B1 * | 2/2016 | Saylor | ..................... | H04L 67/06 |
| 9,378,389 B2 * | 6/2016 | Kantor | ................. | H04L 63/102 |
| 10,043,025 B2 * | 8/2018 | Ibel | ........................ | H04L 63/102 |
| 10,216,449 B1 * | 2/2019 | Li | ......................... | G06F 11/1451 |
| 10,860,694 B2 * | 12/2020 | Goldston | .............. | G06F 16/686 |

(Continued)

OTHER PUBLICATIONS

Kaminsky, Michael, et al. "Decentralized user authentication in a global file system." Proceedings of the nineteenth ACM symposium on Operating systems principles. 2003, pp. 60-73. (Year: 2003).*

(Continued)

*Primary Examiner* — Kari L Schmidt
(74) *Attorney, Agent, or Firm* — Arc IP Law, PC; Joseph J. Mayo (57) ABSTRACT

System and method for universal file access control in which a processor determines whether or not a user or process requesting access to a file has been granted an access privilege to the file by reading an access control list associated with the user or process or with a group to which the user is a member; if the user or process is determined to have been granted access privilege, retrieve stored directory descriptor information associated with the requested file; obtain a unique file handle associated with the user or process and the requested file; determine if the unique file handle has been used before by comparing the obtained unique file handle with a plurality of stored prior-used file handles; and if the unique file handle has not been used before, retrieve the requested file according to a local access protocol.

8 Claims, 3 Drawing Sheets

Flow diagram of UACL directory listing (56) References Cited

U.S. PATENT DOCUMENTS

| | | | | |
|---|---|---|---|---|
| 11,295,029 B1* | 4/2022 | Greenblatt | .......... | H04N 1/32144 |
| 2003/0163483 A1* | 8/2003 | Zingher | ................ | G06Q 10/10 |
| 2003/0212806 A1* | 11/2003 | Mowers | ................ | G06F 21/33 |
| | | | | 726/4 |
| 2004/0238645 A1* | 12/2004 | Abellan Sevilla | .. | G06F 21/6218 |
| | | | | 235/492 |
| 2006/0095382 A1* | 5/2006 | Mahlbacher | ............ | G06F 21/10 |
| | | | | 705/59 |
| 2007/0239695 A1* | 10/2007 | Chakra | ................ | G06F 16/176 |
| 2009/0055921 A1* | 2/2009 | Field | .................. | G06F 21/6236 |
| | | | | 726/14 |
| 2009/0106549 A1* | 4/2009 | Mohamed | ........... | G06F 21/6218 |
| | | | | 713/156 |
| 2009/0106552 A1* | 4/2009 | Mohamed | ........... | G06F 21/6227 |
| | | | | 713/165 |
| 2010/0228798 A1* | 9/2010 | Kodama | ................ | G06F 16/29 |
| | | | | 709/227 |
| 2012/0137130 A1* | 5/2012 | Vainstein | .............. | H04L 63/102 |
| | | | | 713/165 |
| 2016/0275450 A1* | 9/2016 | Chang | .................... | G06F 21/31 |
| 2019/0201117 A1* | 7/2019 | Yates | .................... | A61B 34/76 |
| 2020/0314109 A1* | 10/2020 | Subhash | ............ | G06F 21/6218 |
| 2021/0224404 A1* | 7/2021 | Shrinivasan | .......... | H04L 9/3242 |

OTHER PUBLICATIONS

W. M. Petullo, W. Fei, J. A. Solworth and P. Gavlin, "Ethos' Deeply Integrated Distributed Types," 2014 IEEE Security and Privacy Workshops, 2014, pp. 167-180. (Year: 2014).*

* cited by examiner

Flow diagram of UACL directory listing

FIG. 3

UNIVERSAL FILE ACCESS CONTROL SYSTEM AND METHOD

FIELD OF INVENTION

Embodiments of the present invention are generally directed to a system and a method for universal file access control regardless of file system.

BACKGROUND

Technical Problem

Many organizations have user data stored across multiple platforms and even in multiple datacenters or public cloud locations. This distributed data arrangement can lead to issues of how to control access to all of the various data within the organization. Many organizations also may have a centralized single sign-on service that acts as a single point of authority for user management, but there is not a single location for access control of corporate data.

For example a company may have a Microsoft Windows® NT File System (NTFS) (available from Microsoft Corporation or Redmond, Wash.) based file storage system, a Microsoft One Drive™ file system, a Google® Drive file system, and a High Performance Computing (HPC) platform file system based on Linux™ with a distributed file system such as the Network File System (NFS) developed by Sun Microsystems™ of Santa Clara, Calif. In such a system with multiple different file systems, it is required to manage five different Access Control Lists (ACLs), and to make sure that they can all use the same groups and user accounts. However, the different file systems may have different interfaces to manage access control and, furthermore, the access control may be segregated among systems. Thus, there is a need to be able to control all File and Data Access from a single interface. This is one aspect of the problem to which the present embodiments are directed.

The above-described issues may be further compounded as an organization attempts to migrate to the cloud. Cloud implementation may require a shift from, for example, block storage based on the Portable Operating System Interface (POSIX™) standard, IEEE Std. 1003.1-1988 with varied access control mechanisms, and to an additional, and likely incompatible ACL system. This can greatly complicate and in some cases possibly prohibit cloud migration. Therefore, embodiments may provide for centralized ACLs as well as the ability to ingest existing ACLs and translate them between file systems so that data can be migrated from on-premise POSIX™ file systems to cloud-based object storage while keeping the existing ACLs intact. This avoids the need to recreate all user accounts and groups on the new platform and to reset the ACLs to utilize the new cloud accounts instead of the existing on-premise accounts.

Technical Solution

Therefore, embodiments can comprise a high-level file access control list that works cross-platform to supply file access controls to any underlying file system, including but not limited to, the fourth extended journaling file system for Linux™ (EXT4), the third extended journaling file system for Linux™ (EXT3), the second extended file system for the Linux™ kernel (EXT2), Network File System (NFS), the Andrew File System (AFS) for distributed systems developed by Carnegie Mellon University, the General Parallel File System (GPFS) high-performance clustered file system software developed by IBM™ Corporation of Armonk, N.Y., and cloud-based object storage. Embodiments can improve existing file access technologies such as those using "Filesystems in User Space" ("FUSE") by allowing users to abstract access to an underlying file system.

Furthermore, FUSE also has additional overhead due to the management of the underlying data structures instead of just providing access control, which can cause increased memory and CPU utilization on the host systems. In contrast, embodiments can comprise Universal File Access Control which focuses on the file or object security rather than including abstracting the entire file system, thereby limiting the additional load on the host system.

There are currently available FUSE file systems designed to make cloud-based object storage look like POSIX™ based storage and attempt to transfer ACLs to the cloud, however these systems lack the ability to automatically transfer ACLs from one file system to another because of dependencies due to accounts existing in both locations. There is also the added overhead of account translation, and most FUSE file systems are mounted as a single user and rely on the ACLs of the underlying file system to control access. This can require the file system to be remounted for every user, which is not practical on a multiuser system.

While existing systems may provide centralized ACL management, i.e., centrally managing data access control lists, such existing systems still rely on varied mechanisms for securing the data that depends heavily on the security mechanisms of the underlying storage. In contrast, embodiments can include a centralized access control system that all file and data access within an organization must pass through in order to receive one-time keys for access to data.

Existing access control systems can also use different databases spread across the enterprise to manage data access control. For example, a Windows™ network may use the Active Directory (AD) directory service developed by Microsoft for Windows™ domain networks, or NTFS permissions and any Linux™ based system (although they may be configured to use Active Directory for Authentication and still utilize Linux native access control lists for data access). These can be stored locally to the file system on the file server, and thus there is a risk of credentials remaining configured on underlying systems when accounts are removed from service. This leaves a potential security risk in data access control.

SUMMARY

Therefore, various embodiments can include a system and method using a Universal File Access Control List in which access control is handled by an additional software layer, and the underlying file systems have access limited to a set of management accounts for access control at the system level. These management accounts may pass the file access through the centralized system, allowing for more granular control mechanisms than exist on the underlying file system.

There is an additional security risk added by layer in this fashion that already exists in a decentralized fashion today. That is the concept of the root, or master service account. The main difference being that this centralized management account if compromised would have access to all the data in an organization. Therefore, various embodiments can require a service account per file access point (i.e. file server, user workstation, web server, etc.).

In particular, the system according to at least one embodiment can include a centralized database, such as a backend database, that contains a master list of all files, users, groups and access controls. A mechanism for managing the access controls, importing existing controls, and transferring controls between file systems. Abstracting the access control from the underlying file system allows the access to follow the file across the organization rather than being locked to the original system.

A plugin to encrypt files on the storage system and to store a randomized encryption key in the master database can be added to provide increased security. For example, in various embodiments, only the master account is able to access the encrypted file, but not the contents, and only the users with access to the key in the database can read the files. In some embodiments, it may be necessary to recreate all files and objects to implement the encrypted storage.

Thus, embodiments can comprise a high level file access control list that works cross-platform to supply file access controls for any underlying file system, including but not limited to EXT4, EXT3, EXT2, NFS, AFS, GPFS, and cloud-based object storage. Embodiments can also improve existing file access technologies such as those using "Filesystems in User Space" ("FUSE") by allowing users to abstract access to an underlying file system. For example, FUSE™-based file access can have additional overhead due to the management of the underlying data structures, and instead of just access control mechanisms, and can cause increased memory and computing processing unit (CPU) utilization on the host systems. Therefore, in various embodiments, the present Universal File Access Control system and method is directed to the file or object security aspects rather than abstracting the entire file system, thereby limiting the additional load on the host system.

Accordingly, embodiments can include a universal file access control system comprising a processor; and a memory storing a program for execution by the processor, the program including instructions which, when executed by the processor, cause the processor to determine whether or not a user or process requesting access to a file has been granted an access privilege to the file by reading an access control list associated with the user or process or with a group to which the user or process is a member. If the user or process is determined to have been granted access privilege, retrieve stored directory descriptor information associated with the requested file, obtain a unique file handle associated with the user or process and the requested file, determine if the unique file handle has been used before by comparing the obtained unique file handle with a plurality of stored prior-used file handles, and if the unique file handle has not been used before, retrieve the requested file according to a local access protocol. The instructions stored in memory can further include instructions which cause the processor to determine if the directory descriptor information is encrypted, and obtain a key along with the unique file handle associated with the user or process and the requested file, and retrieve the requested file according to the local access protocol using the key. The instructions stored in memory can further include instructions which cause the processor to import stored directory descriptor information associated with a plurality of files, wherein access control to each file is provided in accordance with one of a plurality of different file systems; and, for each file, determine a universal path to the file and its associated access control list which may include any one of the plurality of file systems; and establish a universal file access control list using the determined universal path for each file. The universal path and universal access control list can be stored using a database system.

Embodiments can also include a universal file access control method comprising determining whether or not a user or process requesting access to a file has been granted an access privilege to the file by reading an access control list associated with the user or process or with a group to which the user is a member; if the user or process is determined to have been granted access privilege, retrieving stored directory descriptor information associated with the requested file; obtaining a unique file handle associated with the user or process and the requested file; determining if the unique file handle has been used before by comparing the obtained unique file handle with a plurality of stored prior-used file handles; and, if the unique file handle has not been used before, retrieving the requested file according to a local access protocol. The universal file access control method can further include determining if the directory descriptor information is encrypted, and obtaining a key along with the unique file handle associated with the user or process and the requested file. Retrieving the requested file according to the local access protocol can further include retrieving the requested file using the key. The universal file access control method can further include importing stored directory descriptor information associated with a plurality of files, in which access control to each file is provided in accordance with one of a plurality of different file systems, and, for each file, determining a universal path to the file and its associated access control list which may include any one of said plurality of file systems, and establishing a universal file access control list using the determined universal path for each file. The universal file access control method can further include storing the universal path and the universal access control list using a database system.

BRIEF DESCRIPTION OF THE DRAWINGS

Embodiments will be more clearly understood from the following detailed description taken in conjunction with the accompanying drawings. FIGS. 1-3 represent non-limiting embodiments as described herein.

DETAILED DESCRIPTION

Embodiments of the present invention are generally directed to a system and a method for universal file access control.

For example, embodiments can comprise system that uses a centralized access control list to provide centralized access control and being configured to eliminate the utilization of the local file system security, in that aside from utilizing a single, or a set of universal service accounts, with direct access to the data, the end users have no rights to the raw storage mechanisms and must access all data through a centralized access control system. The access control system can be an appliance such as a physical hardware device, or a virtual computer image that centralizes the access control.

Figure 1:
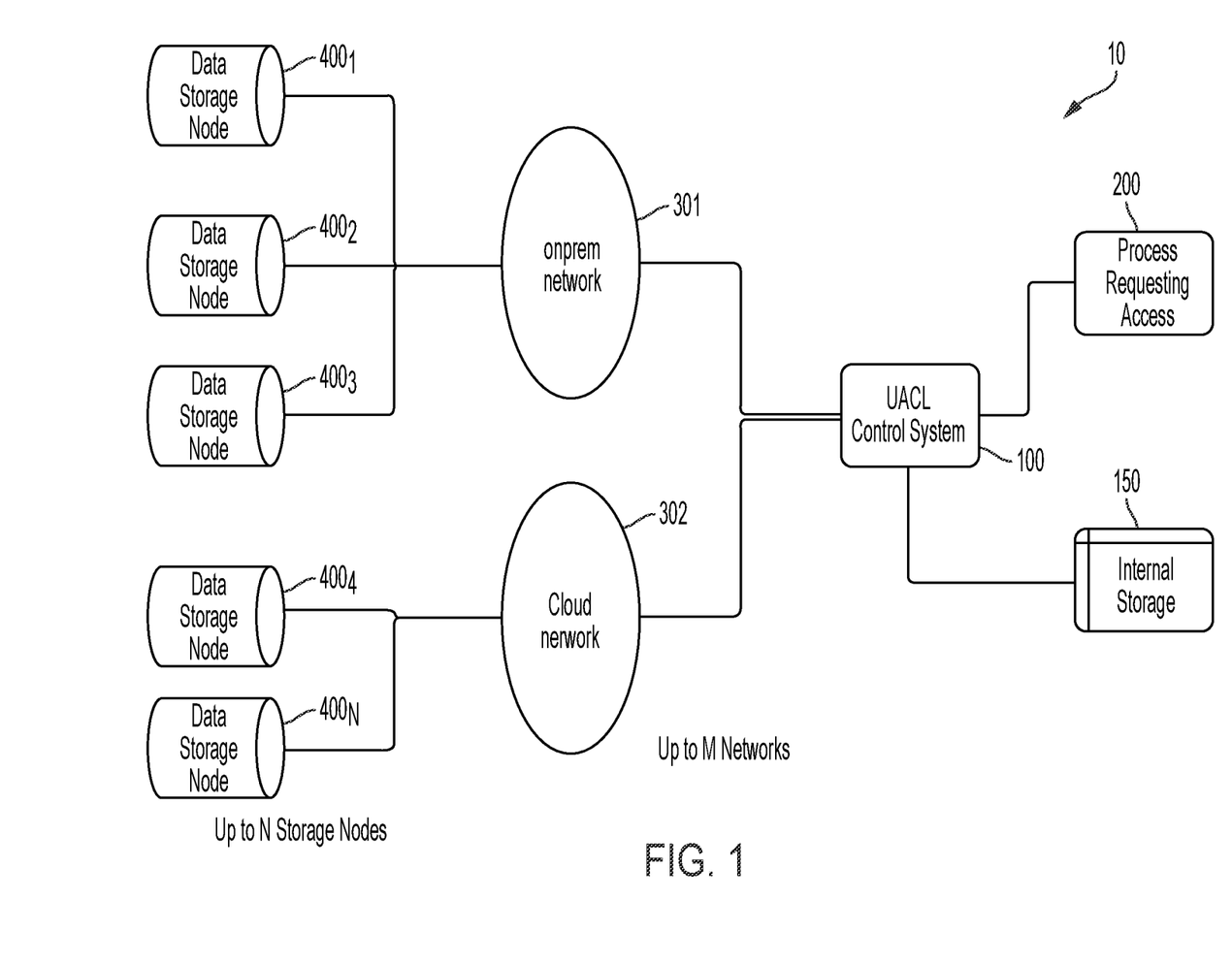
FIG. 1 is a top-level system block diagram of a data network which includes a universal access control system according to various embodiments.

For example, FIG. 1 is a top-level system block diagram of a data network 10 which includes a universal access control system 100 according to various embodiments. Referring now to FIG. 1, there is shown the universal access control system 100 coupled to a process requesting access

200. The process requesting access 200 may run on a user device such as a personal computer, laptop computer, Internet-enabled or WiFi™-enabled phone, or the like. The universal access control system 100 is also coupled to a plurality of data storage nodes $400_1$ to $400_n$ (where "n" is any integer) via one or more communications networks 301 or 302. The plurality of data storage nodes $400_1$ to $400_n$ can comprise one of more servers or computing systems each accessing data in accordance with one or more of a variety of different file systems. As shown in FIG. 1, the communication network 301 is an onprem ("on premises") network, and communication network 302 is a cloud-based network. In various embodiments, the universal access control system 100 may be provided in communication with multiple ("M") networks (wherein "M" is any integer). The universal access control system 100 may also be coupled to an internal storage node 150, which may be a local storage device such as a disk array, networked storage, or cloud-based storage. In at least one embodiment, the internal storage node 150 can be a local storage device of the end user computer such as, for example, a local disk or solid state drive on the computer, or removable media such as a Universal Serial Bus (USB) drive or other device.

For example, the data network 10 may be a company network comprising a plurality of data storage nodes 400 which access and/or store data in accordance with multiple different file access systems. For example, data storage node $400_1$ may use the Microsoft Windows® NT File System (NTFS) (available from Microsoft Corporation or Redmond, Wash.) based file storage system, data storage node $400_2$ may use the Microsoft One Drive™ file system, and so on. Other data storage nodes 400n may use a Google® Drive file system, and a High Performance Computing (HPC) platform file system based on Linux™ with a distributed file system such as the Network File System (NFS) developed by Sun Microsystems™ of Santa Clara, Calif. In such a system with multiple different file systems, it is required to manage many different Access Control Lists (ACLs), and to make sure that they can all use the same groups and user accounts. However, the different file systems may have different interfaces to manage access control and, furthermore, the access control may be segregated among systems. Thus, for a given process requesting access 200, there is a need to be able to control all File and Data Access from a single interface such as the universal file access system 100 according to various embodiments.

The data storage nodes 400 may communicate with each other as well as other devices and services within the file network 10, including the process requesting access 200, using a communication network 301/302. In at least one embodiment, the communication network 302 comprises a cloud-based network and may include both public and private communication networks such as, for example, the World Wide Web and/or a company intranet. In at least one embodiment, the cloud implementation may provide file access using block storage based on the Portable Operating System Interface (POSIX™) standard, IEEE Std. 1003.1-1988, and may also include various access control mechanisms such as a particular ACL system.

Various embodiments comprise a universal file access control system 100 configured to provide for file access by a process requesting access 200 using centralized ACLs, as well as configured to provide the ability to ingest or receive existing ACLs and translate them between file systems so that data can be migrated from, for example, an on-premise POSIX™ file system to cloud-based object storage while keeping the existing ACLs intact. Embodiments thus avoid the need to recreate all user accounts and groups on the new platform and to reset the ACLs to utilize the new cloud accounts instead of the existing on-premise accounts. In at least one embodiment, the universal file access control system 100 comprises a computing platform configured to provide centralized file access control as described herein. In such embodiments, the universal file access control system 100 can comprise a processor coupled to a memory in which is stored a sequence of programmed instructions which, when retrieved and executed by the processor, cause the processor to perform universal file access control as described herein. However, in various alternative embodiments, the universal file access control system 100 can comprise a virtual machine implemented as one or more instances of a sequence of programmed instructions executing as a thread on a processor which, when executed by the processor, cause the processor to perform universal file access control as described herein. Examples of such processors include the i7 multicore processor available from Intel® Corporation of Santa Clara, Calif.

In some embodiments, a plugin to encrypt files on the storage system and to store a randomized encryption key in the master database are provided for increased security. For example, in various embodiments, only the master account is able to access the encrypted file, but not the contents, and only the users with access to the key in the database can read the files. In some embodiments, it may be necessary to recreate all files and objects to implement the encrypted storage.

Figure 2:
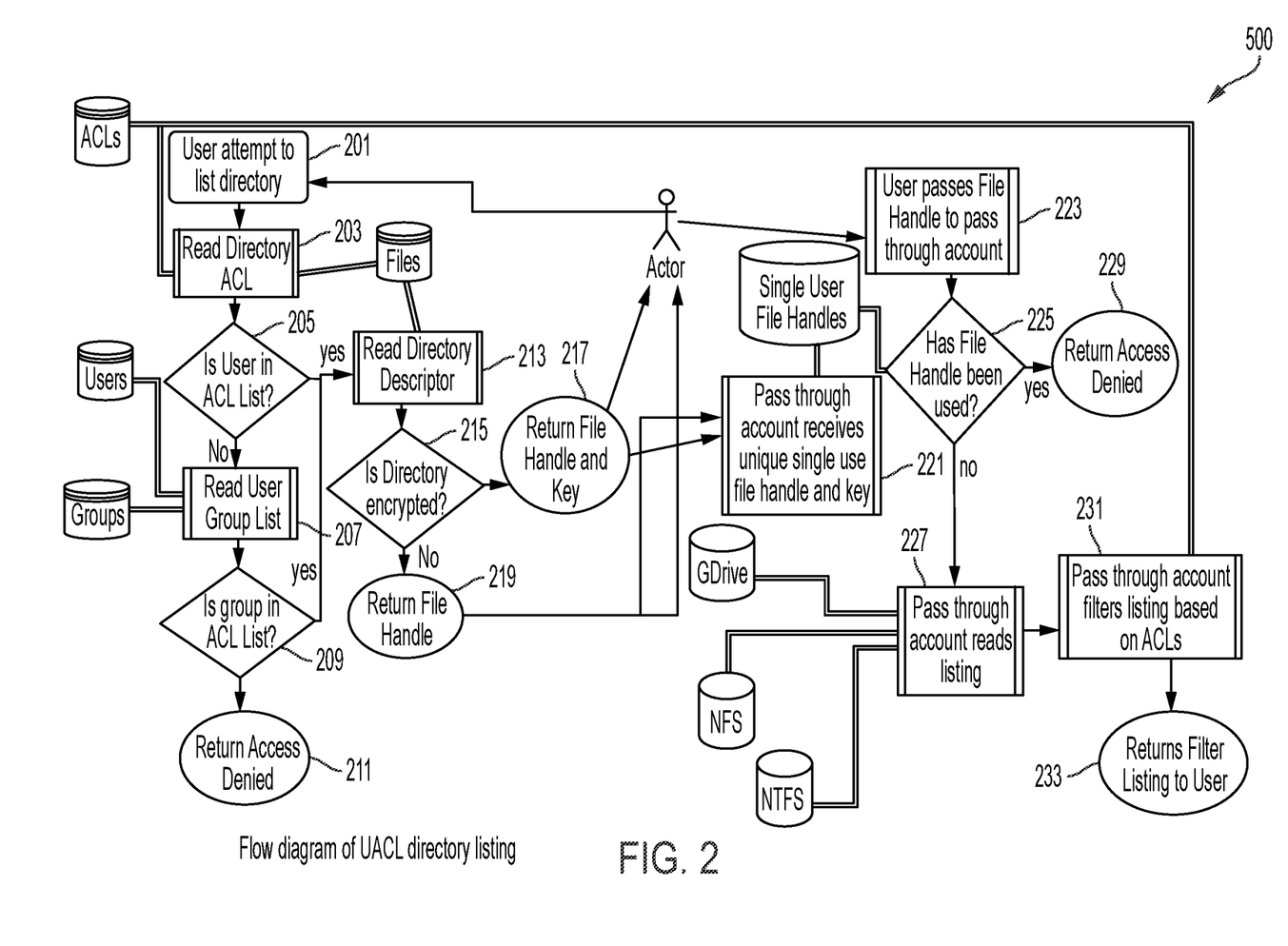
FIG. 2 is a flow diagram of a universal file access control method according to various embodiments.

With regard to FIG. 2, there is shown a flowchart for a universal access control (UACL) method 500 according to at least one embodiment. At initial installation of the universal file access control system 100, all managed file systems and data can be imported with an import utility and run a series of analysis steps to determine both the universal path to the data files and the existing access control lists. The existing access control lists are imported to the new system including the universal file access control system 100 and users seeking file access via, for example, the device of the process requesting access 200, are pointed to the new system via a client interface of the device of the process requesting access 200. Once the new system is fully populated and all users are accessing data through the appliance, a second script can be run to remove the existing ACLs on the native storage objects and replace them with the access control service accounts, this step secures the data so that it can only be accessed via the tokens generated in the UACL system.

In particular, referring now to FIG. 2, a UACL method 500 can commence with a user initiating a request to access a file from a process requesting access 200, which causes the UACL system 100 to attempt to access a universal access list directory (block 201). The UACL system 100 then will read a Directory ACL to determine if the requesting user has been granted access privilege to the associated file (block 203). If the UACL system 100 determines that the requesting user is listed in the ACL for the associated requested file (block 205), indicating access permission has been granted, then the UACL method 500 can proceed to read the directory descriptor information associated with the requested file (block 213). On the other hand, if the UACL system 100 determines that the requesting user is not listed in the ACL for the associated requested file (block 205), indicating access permission has not been granted, then the UACL method 500 can instead proceed to read a User Group List (block 207) to determine if the requesting user is a member of any groups who have been granted access permission to the associated file. If the UACL system 100 determines that the requesting user is listed in the User Group List for the associated requested file (block 209), indicating access permission has been granted, then the UACL method 500 can proceed to read the directory descriptor information associated with the requested file (block 213). On the other hand, if the UACL system 100 determines that the requesting user is not listed in the User Group List for the associated requested file (block 209), indicating access permission has not been granted, then the UACL method 500 can instead proceed to return an indication that access to the associated file is denied (block 211). In various embodiments, the ACLs, list of users, list of associated files, and list of groups is stored in one or more database storage systems.

Upon reading the directory descriptor information associated with the requested file (block 213), the UACL method 500 can proceed to determine if the directory descriptor information is encrypted (block 215). If the UACL system 100 determines that the directory descriptor information associated with the requested file is encrypted (block 215), then the UACL method 500 can proceed to return a unique file handle and key to the requesting user via the requesting access device 200 (block 217) and to pass through the unique file handle and key to the UACL 100 system for further processing (block 221). On the other hand, if the UACL system 100 determines that the directory descriptor information associated with the requested file is not encrypted (block 215), then the UACL method 500 can proceed to return only the unique file handle, but not the key, to the requesting user via the requesting access device 200 (block 217) and to pass through the unique file handle, but not the key, to the UACL 100 system for further processing (block 221). In at least one embodiment, the unique file handle is a single-use file handle that is valid for only one file access operation. A list of old file handles that have previously been used can be stored in a database storage system accessible by the UACL system 100.

The UACL method 500 can then receive the file handle from the user (block 223) or directly without being entered by the user (block 221), and then proceeds to determine if the file handle has been used before (block 225). In at least one embodiment, the UACL method 500 can determine whether or not the unique file handle has been used before by comparing the entered or received file handle with the stored list of old file handles. If the UACL system 100 determines that the file handle has not been used before, and so is valid (block 225), then the UACL method 500 can pass through the user access account information for retrieval of the requested file (block 227). On the other hand, if the UACL system 100 determines that the file handle has been used before, and so is not valid (block 225), then the UACL method 500 can instead proceed to return an indication that access to the associated file is denied (block 229).

Upon receiving the user account information (block 229), the UACL system 100 can proceed to pass through the account filters associated with the requesting user based on the ACLs (block 231) and proceed to read the requested file according to the local access protocol (block 233), at which point the UACL method 500 may end.

Figure 3:
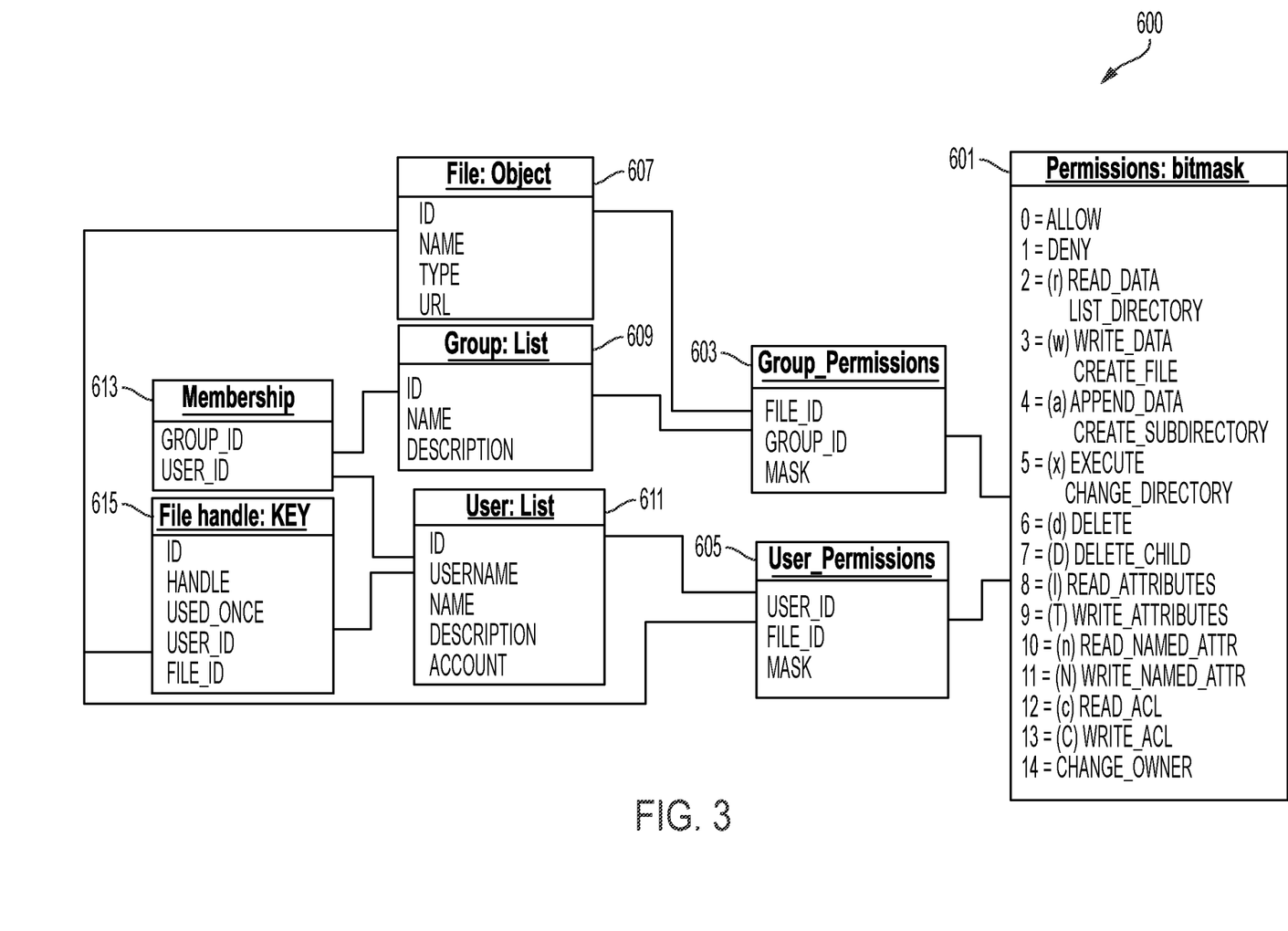
FIG. 3 is a universal file access control database schema according to various embodiments.

With regard to FIG. 3, there is shown a universal access control list (UACL) database schema 600 according to various embodiments. Referring now to FIG. 3, a universal access control list (UACL) can comprise a permissions bitmask 601 which contains a plurality of access permission parameters associated with a particular file to which access is requested by the user. For example, in various embodiments, the UACL permissions bitmask 601 can comprise parameters for allowing access ("allow"), denying access ("deny"), read data list directory, write data create file, append data create subdirectory, execute change directory, delete, delete child, read attributes, write attributes, read named attribute ("read named attr"), write named attribute ("write named attr"), read access control list ("read_acl"), write access control list ("write_acl"), and change owner, as shown below in Table 1.

TABLE 1

Permissions Bitmask

| BIT | Symbol | NAME | Description |
| --- | --- | --- | --- |
| 0 | A | Allow | Allow List |
| 1 | X | Deny | Deny List |
| 2 | r | READ_DATA | Read Data or List Directory |
| 3 | w | WRITE_DATA | Write Data or Create File |
| 4 | a | APPEND_DATA | Append File or create subdirectory |
| 5 | x | EXECUTE | Execute File or change directory |
| 6 | d | DELETE | Delete a file or empty directory |
| 7 | D | DELETE_CHILD | Allow children to be delete (subdirectory or file) |
| 8 | t | READ_ATTRIBUTES | Read file or directory attributes |
| 9 | T | WRITE_ATTRIBUTES | Write file or directory attributes |

TABLE 1-continued

Permissions Bitmask

| BIT | Symbol | NAME | Description |
|---|---|---|---|
| 10 | n | READ_NAMED_ATTR | Read a named attribute |
| 11 | N | WRITE_NAMED_ATTR | Write a named attribute |
| 12 | c | READ_ACL | Read an access control list |

609. Each file object 607 can specify a file object identifier ("ID"), file object name ("NAME"), a file object type ("TYPE"), and a file object Universal Resource Locator (URL), as shown below in Table 4. Each group list 609 can specify a group identifier ("ID"), a group name, and a group description, as shown below in Table 5, and can also be associated with a membership list 613 which comprises a group identifier ("GROUP_ID") and a user identifier ("USER_ID"), as shown below in Table 6.

TABLE 4

File Object

| ID | NAME | TYPE | URL |
|---|---|---|---|
| 0 | /home | Directory | \\FILESERVER\HOME |
| 1 | /nfshome | Directory | LINUXFS:/nfshome |
| 2 | /home/dsmith | Directory | \\FILESERVER\HOME\dsmith |
| 3 | /nfshome/dsmith | Directory | LINUXFS:/nfshome/dsmith |
| 4 | /nfshome/dsmith/.ssh | Directory | LINUXFS:/nfshome/dsmith/.ssh |
| 5 | /nfshome/dsmith/.ssh/authorized_keys | File | LINUXFS:/nfshome/dsmish/.ssh/authorized_keys |
| 6 | /home/dsmith/Profile/ntuser.dat | File | \\FILESERVER\HOME\dsmith\Profile\ntuser.dat |
| 7 | /home/dsmith/Profile | Directory | \\FILESERVER\HOME\dsmith\Profile |

TABLE 1-continued

Permissions Bitmask

| BIT | Symbol | NAME | Description |
|---|---|---|---|
| 13 | C | WRITE_ACL | Write an access control list |
| 14 | O | CHANGE_OWNER | Change the ownership of a file |

In various embodiments, each UACL permissions bitmask 601 can be associated with a set of group permissions 603 or a set of user permissions 605, or both. Each set of group permissions 603 can specify a file identifier ("FILE_ID"), group identifier ("GROUP_ID"), and a mask, as shown below in Table 2. Each set of user permissions 605 can specify a user identifier (USER_ID"), a file identifier ("FILE_ID"), and a mask, as shown below in Table 3.

TABLE 2

Group Permissions

| FILE_ID | GROUP_ID | MASK | |
|---|---|---|---|
| 0 | 1 | 1010010010100100 | |
| 0 | 0 | 0101111111111111 | |
| 2 | 1 | 0100000000000000 | |
| 1 | 1 | 0010110110101011 | *Explicitly deny users the rights to create, append or change files in the/home directory. |

TABLE 3

User Permissions

| FILE_ID | USER_ID | MASK | |
|---|---|---|---|
| 2 | 2 | 0101111111111111 | * Has full permissions to own home directory |
| 2 | 3 | 0011111111111111 | * Has explicitly denied all permission to another user (DENY always overrides ALLOW permissions.) |

In various embodiments, each set of group permissions 603 can be associated with a file object 607 and a group list

TABLE 5

Group List

| ID | NAME | DESCRIPTION |
|---|---|---|
| 0 | administrators | Object Admins Group |
| 1 | Users | All Users Group |
| 2 | Finance | Financial Users |
| 3 | IT | Information Technology Team |

TABLE 6

Memberships

| GROUP_ID | USER_ID |
|---|---|
| 0 | 0 |
| 0 | 1 |
| 1 | 0 |
| 1 | 1 |
| 1 | 2 |
| 1 | 3 |
| 1 | 4 |
| 1 | 5 |
| 2 | 2 |
| 2 | 4 |
| 3 | 0 |
| 3 | 1 |
| 3 | 3 |

In various embodiments, each set of user permissions 605 can be associated with a user list 611. Each user list 611 can specify a user identifier ("ID"), user username ("USERNAME"), a user name ("NAME"), a user description, and a user account, as shown below in Table 7. Each user list 611 can be associated with the membership list 613 which comprises a group identifier ("GROUP_ID") and a user identifier ("USER_ID"), and can also be associated with a file handle key 615. The file handle key 615 can comprise a file handle identifier ("ID"), a handle ("HANDLE"), a used-once indicator ("USED_ONCE"), a user identifier ("USER_ID"), and file identifier ("FILE_ID"), as shown below in Table 8.

TABLE 7

User List

| ID | USERNAME | NAME | DESCRIPTION | ACCOUNT |
|---|---|---|---|---|
| 0 | admin | Default Admin Account | Admin Account | ActiveDirectory/Administrator |
| 1 | Root | Default Root Account | Root Account | NIS+/root |
| 2 | dsmith | David Smith | Accountant | ActiveDirectory/dsmith |
| 3 | scott.davis | Scott Davis | Senior System Admin | |
| 4 | jbarnes | Julia Barnes | CIO | |
| 5 | gthompson | George Thompson | Lawn Care | |

TABLE 8

File Handle

| TIME | HANDLE | USED_ONCE | USER_ID | FILE_ID | |
|---|---|---|---|---|---|
| Jul. 29, 2020 17:17:36 | a87djsdiga8hd | Yes | 1 | 1 | *One time file handle has expired. |
| Jul. 28, 2020 14:39:52 | as;lkfjuf9458gn | Yes | 2 | 1 | *One time file handle has expired. |
| Jul. 28, 2020 15:03:29 | asfjaoisffdsaiof | No | 3 | 1 | *One time file handle is still valid. |

A script runs on a set interval dropping all used file handles and unused handles older than timeout.

Thus has been shown a universal file access control system and method, the system including a processor and a memory storing a program for execution by the processor, the program including instructions which, when executed by the processor, cause the processor to determine whether or not a user or process requesting access to a file has been granted an access privilege to the file by reading an access control list associated with the user or process or with a group to which the user or process is a member. If the user/process is determined to have been granted access privilege, the system retrieves the stored directory descriptor information associated with the requested file; obtains a unique file handle associated with the user/process and the requested file; determines if the unique file handle has been used before by comparing the obtained unique file handle with a plurality of stored prior-used file handles; and, if the unique file handle has not been used before, retrieves the requested file according to a local access protocol.

The instructions stored in memory further comprise instructions which cause the processor to determine if the directory descriptor information is encrypted; and obtain a key along with the unique file handle associated with the user or process and the requested file; and retrieve the requested file according to the local access protocol using the key.

The instructions stored in memory further comprise instructions which cause the processor to import stored directory descriptor information associated with a plurality of files, wherein access control to each said file is provided in accordance with one of a plurality of different file systems; for each said file, determine a universal path to said file and its associated access control list which may include any one of said plurality of file systems; and establish a universal file access control list using said determined universal path for each said file.

The universal path and said universal access control list can be stored using a database system.

The access control system can be an appliance such as a physical hardware device, or a virtual computer image that centralizes the access control. For example, in various embodiments, an "appliance" can refer to a physical device in the form of a hardware server running the codebase, or a virtual appliance either in a hypervisor or on the cloud. Such a device 100 (referring again to FIG. 1) may be an electronic device which may include a computer, display, and, in some embodiments, one or more I/O devices. The electronic device can be a stationary electronic device (such as, for example, a desktop computer) or a portable electronic device (such as, for example, a laptop, tablet, etc.). The computer includes a bus coupled to a processor and a memory, a display interface, one or more I/O interfaces, and one or more communication interfaces. Generally, display interface is coupled to display, I/O interface is coupled to I/O device using a wired or wireless connection, and communication interface can be connected to an antenna and coupled to a network using a wireless connection. If the electronic device is a stationary electronic device, the communication interface can be connected to the network using a wired or a wireless connection. One of the I/O interfaces can be connected to the antenna.

The bus is a communication system that transfers data between the processor, the memory, the display interface, the I/O interfaces, and the communication interface, as well as other components. A power connector may also be coupled to the bus and to a power supply such as a battery, etc.

The processor can include one or more general-purpose or application-specific microprocessors to perform computation and control functions for the computer. The processor can include a single integrated circuit, such as a microprocessing device, or multiple integrated circuit devices and/or circuit boards working in cooperation to accomplish the functions of the processor. In addition, the processor can execute computer programs, such as an operating system, a database management system, one or more applications, or data stored in the memory.

The memory can store information and instructions for execution by the processor. The memory can also contain various components for retrieving, presenting, modifying, and storing data. For example, the memory can store software modules that provide the functions described herein if executed by the processor. The modules can include an operating system that provides operating system functionality for the computer, and can also include a database management system that provides the processing functions described above. Applications can include those that cooperate with the database management system. Data can include training data of the multiple programming languages, information associated with the natural human language communication, languages semantics, programming languages references, domain specific contexts, programming language contextual trained data, metadata and other references (such as references required for the communication and to make decisions).

Generally, the memory can include a variety of non-transitory computer-readable media that can be accessed by the processor. In the various embodiments, the memory can include a volatile medium, a nonvolatile medium, both volatile and nonvolatile mediums, a removable and non-removable medium, a communication medium, and a storage medium. A communication medium can include computer readable instructions, data structures, program modules, or other data in a modulated data signal such as a carrier wave or other transport mechanism, and can include any other form of an information delivery medium known in the art. A storage medium can include a volatile memory (e.g., random access memory ("RAM"), dynamic RAM ("DRAM"), static RAM ("SRAM"), synchronous dynamic random access memory ("SDRAM")), or a non-volatile memory (e.g., read only memory ("ROM"), flash memory, cache memory, programmable read-only memory ("PROM"), erasable programmable read-only memory ("EPROM"), electrically erasable programmable read-only memory ("EEPROM")), registers, hard disk, a removable disk, a compact disk read-only memory ("CD-ROM"), or any other form of a storage medium known in the art.

The display interface can be coupled to a display. The display can be a liquid crystal display (LCD) of a laptop, a tablet, or a similar device.

The I/O interfaces are configured to transmit and/or receive data from I/O devices. The I/O interfaces enable connectivity between the processor and I/O devices by encoding data to be sent from the processor to the I/O devices, and decoding data received from I/O devices for the processor. Generally, data can be sent over wired and/or a wireless connections. For example, the I/O interfaces can include one or more wired communications interfaces, such as USB or Ethernet, and/or one or more wireless communications interfaces, coupled to one or more antennas, such as Wi-Fi, cellular, BLUETOOTH, cloud-based interface, or similar platforms.

Generally, an I/O device is a device configured to provide input to the computer, and/or output from the computer. An I/O device is operably connected to the computer using either a wireless connection or a wired connection. An I/O device can include a local processor coupled to a communication interface that is configured to communicate with the computer using the wired or wireless connection. For example, an I/O device can be an input device such as a touchscreen for the display, a touchpad, a keypad or keyboard, etc. The I/O device can also be an output device, such as one or more audio speakers. The processor can transmit an audio signal to a speaker (an I/O device) through an audio interface (an I/O interface), which in turn outputs audio effects.

Thus, embodiments have been specifically illustrated and/or described. However, it will be appreciated that modifications and variations of the disclosed embodiments are covered by the above teachings and within the purview of the appended claims without departing from the spirit and intended scope of the invention.

What is claimed is:

1. A universal file access control system comprising:
   a computer that comprises
      a processor;
      at least one input/output interface,
         wherein said at least one input/output interface is configured to one or more of transmit and receive data between said computer and an input/output device;
      a communication interface configured to communicate with a plurality of storage nodes that comprise a plurality of files with a plurality of different file access systems; and
      a memory;
   wherein said universal file access control system is configured to be coupled to a process requesting access device on a user device,
   wherein said memory comprises non-transitory computer-readable media storing a program for execution by the processor, the program including instructions which, when executed by the processor, cause the processor to
      import stored directory descriptor information associated with said plurality of files from said plurality of storage nodes via an import utility to said universal file access control system, wherein access control to each file of said plurality of files is provided in accordance with one of said plurality of different file access systems;
      attempt to access a universal access list directory upon a user initiating a request to access a file from said user device via a client interface of said process requesting access device,
      determine whether or not said user or said process requesting access device requesting access to said file has been granted an access privilege to the file by reading an access control list associated with the user or said process requesting access device or with a group to which the user or said process requesting access device is a member from said universal access list directory;
      in response to said determine, when the user or said process requesting access device is not listed in the access control list associated with the user or said process requesting access device or with said group, indicating said access privilege is not granted, return an indication to said user that access to the file is denied;
      in response to said determine, when the user or said process requesting access device is listed in the access control list associated with the user or said process requesting access device or with said group, indicating said access privilege is granted, retrieve said stored directory descriptor information associated with the file that is requested;
      read the stored directory descriptor information associated with the file that is requested;
      obtain a unique file handle associated with the user or said process requesting access device and the file that is requested;
      upon reading the stored directory descriptor information associated with the file that is requested, determine if the stored directory descriptor information is encrypted;
      in response to said determine if the stored directory descriptor information is encrypted, when the stored directory descriptor information associated with the file that is requested is encrypted,
         return the unique file handle and key to the user via the client interface of the process requesting access device of the user device, and
         pass through the unique file handle and key for further processing;
      in response to said determine if the stored directory descriptor information is encrypted, when the stored directory descriptor information associated with the file that is requested is not encrypted, return only the unique file handle, but not the key, to the user via the client interface of the process requesting access device of the user device, and pass through the unique file handle, but not the key, for further processing;

receive the unique file handle from the user;

determine if the unique file handle has been used before by comparing the unique file handle that is obtained with a plurality of stored prior-used file handles;

in response to said determine if the unique file handle has been used before, when the unique file handle has not been used before,
pass through a user access account information and retrieve the file that is requested according to a local access protocol, and pass through account filters associated with said user based on said access control list and read said file that is requested according to said local access protocol;

in response to said determine if the unique file handle has been used before, when the unique file handle has been used before, return an indication to said user that access to the file is denied.

2. The universal file access control system of claim 1, wherein the instructions that are stored in the memory further comprise further instructions which cause the processor to retrieve the file that is requested according to the local access protocol using the key.

3. The universal file access control system of claim 1, wherein the instructions stored in the memory further comprise further instructions which cause the processor to
for said each file, determine a universal path to said each file and its associated access control list which includes any one of said plurality of different file access systems; and
establish a universal file access control list using said universal path that is determined for said each file.

4. The universal file access control system of claim 3, wherein said universal path and said universal file access control list are stored using a database system.

5. A universal file access control method comprising:
providing a universal file access control system comprising a computer that comprises
a processor,
at least one input/output interface,
wherein said at least one input/output interface is configured to one or more of transmit and receive data between said computer and an input/output device;
a communication interface configured to communicate with a plurality of storage nodes that comprise a plurality of files with a plurality of different file access systems, and
a memory,
wherein said universal file access control system is configured to be coupled to a process requesting access device on a user device,
wherein said memory comprises non-transitory computer-readable media storing a program for execution by the processor;
via said universal file access control system,
importing stored directory descriptor information associated with said plurality of files from said plurality of storage nodes via an import utility to said universal file access control system, wherein access control to each file of said plurality of files is provided in accordance with one of said plurality of different file access systems;
attempting to access a universal access list directory upon a user initiating a request to access a file from the user device via a client interface of said process requesting access device, determining whether or not said user or the process requesting access device requesting access to said file has been granted an access privilege to the file by reading an access control list associated with the user or said process requesting access device or with a group to which the user is a member from said universal access list directory;

in response to said determining, when the user or said process requesting access device is not listed in the access control list associated with the user or said process requesting access device or with said group, indicating said access privilege is not granted, returning an indication to said user that access to the file is denied;

in response to said determining, when the user or said process requesting access device is listed in the access control list associated with the user or said process requesting access device or with said group, indicating said access privilege is granted, retrieving the stored directory descriptor information associated with the file that is requested;

obtaining a unique file handle associated with the user or said process requesting access device and the file that is requested;

reading the stored directory descriptor information associated with the file that is requested;

upon reading the stored directory descriptor information associated with the file that is requested, determining if the stored directory descriptor information is encrypted;

in response to said determining if the stored directory descriptor information is encrypted, when the stored directory descriptor information associated with the file that is requested is encrypted,
returning the unique file handle and key to the user via the client interface of the process requesting access device of the user device, and
passing through the unique file handle and key for further processing;

in response to said determining if the stored directory descriptor information is encrypted, when the stored directory descriptor information associated with the file that is requested is not encrypted,
returning only the unique file handle, but not the key, to the user via the client interface of the process requesting access device of the user device, and
passing through the unique file handle, but not the key, for further processing;

receiving the unique file handle from the user;

determining if the unique file handle has been used before by comparing the unique file handle that is obtained with a plurality of stored prior-used file handles;

in response to said determining if the unique file handle has been used before, when the unique file handle has not been used before,
passing through a user access account information and retrieving the file that is requested according to a local access protocol, and
passing through account filters associated with said user based on said access control list and reading said file that is requested according to said local access protocol;

in response to said determining if the unique file handle has been used before, when the unique file handle has been used before, returning an indication to said user that access to the file is denied.

6. The universal file access control method of claim 5, wherein said retrieving the file that is requested according to the local access protocol further comprises retrieving the file that is requested using the key.

7. The universal file access control method of claim 5, further comprising
for said each file, determining a universal path to said each file and its associated access control list which may include any one of said plurality of different file access systems; and
establishing a universal file access control list using said universal path that is determined for said each file.

8. The universal file access control method of claim 7, further comprising storing said universal path and said universal file access control list using a database system.

\* \* \* \* \*